United States Patent Office
3,748,159
Patented July 24, 1973

3,748,159
HIGH TEMPERATURE CEMENTING COMPOSITIONS CONTAINING A LIGNOSULFONIC ACID SALT AND A PENTABORIC ACID SALT
Charles R. George, Duncan, Okla., assignor to Halliburton Company, Duncan, Okla.
No Drawing. Filed Apr. 20, 1972, Ser. No. 245,996
Int. Cl. C04b 7/02, 13/00
U.S. Cl. 106—90                                                           20 Claims

ABSTRACT OF THE DISCLOSURE

This specification discloses additives for retarding the setting time of cement compositions at high temperatures which are basically comprised of mixtures of a lignosulfonic acid salt and a pentaboric acid salt, novel cement compositions containing the additives and methods of cementing high temperature well formations employing the cement compositions.

The present invention relates to additives for retarding the setting time of cement compositions especially suitable for use in high temperature well cementing operations. In the typical cementing of an oil or gas well, a pipe usually consisting of surface casing and one or more liners, extending from the surface to at least the producing formation is placed in the well bore and cemented in place. The cementing of the pipe is normally effected by pumping a cement composition through the pipe to the bottom thereof and then upwardly through the annular area between the outer surface of the pipe and the surrounding walls of the well bore. When the cement composition reaches the desired position in the annulus, pumping is stopped and the cement composition is allowed to set. The set cement bonds the pipe to the walls of the well bore so that fluid communication between the producing formation and other formations is prevented.

In cementing operations carried out in deep wells, very high temperatures and pressures are often encountered, and as a result, problems with premature setting of the presently known cement blends are also often encountered. For example, in deep wells, temperatures in excess of about 300° F. and accompanying pressures of 15,000 to 20,000 p.s.i. are not uncommon. Cement compositions utilized at such conditions must remain fluid for a period of time sufficient to allow the composition to be pumped down the casing or liner and up the annular space, and in addition, a safety factor must be provided to allow for unavoidable delays. Often, the cement composition is required to remain fluid for periods of time of three hours and longer.

High temperatures catalyze the setting of cement compositions, making the retardation thereof difficult. Accordingly, by the present invention, improved additives for retarding the setting time of cement at high temperatures and novel cement compositions are provided which achieve superior retardation and longer setting times.

The additives of the present invention are basically comprised of mixtures of a lignosulfonic acid salt and a pentaboric acid salt. Suitable lignosulfonic acid salts are those selected from the group consisting of alkaline earth metal lignosulfonates, alkali metal lignosulfonates and ammonium lignosulfonate. For example, suitable alkaline earth metal lignosulfonates are calcium lignosulfonate, magnesium lignosulfonate and barium lignosulfonate. Suitable alkali metal lignosulfonates are sodium lignosulfonate, potassium lignosulfonate and lithium lignosulfonate. Of these various lignosulfonates, calcium lignosulfonate is preferred and is readily commercially available.

The pentaboric acid salts suitable for use in accordance with the present invention are those selected from the group consisting of alkaline earth metal pentaborates, alkali metal pentaborates, and ammonium pentaborate. Examples of particularly suitable alkaline earth metal pentaborates are calcium pentaborate, magnesium pentaborate and barium pentaborate. Examples of alkali metal pentaborates are sodium pentaborate, potassium pentaborate and lithium pentaborate. Of these, sodium pentaborate, potassium pentaborate and ammonium pentaborate are preferred, with the most preferred borate compound being potassium pentaborate.

The additives of the present invention can also include a third component selected from gluconic acid, gluconic acid delta lactone, an alkali metal gluconate and an alkaline earth metal gluconate. Such a gluconic acid compound in the additive brings about superior retardation of the setting of certain cement composition, particularly at high temperatures and pressures. Examples of suitable alkali metal gluconates are sodium gluconate, potassium gluconate and lithium gluconate. Suitable alkaline earth metal gluconates are calcium gluconate magnesium gluconate and barium gluconate. Of the gluconic acid compounds mentioned above, gluconic acid delta lactone is preferred.

The ratio of lignosulfonic acid salt to pentaboric acid salt can vary from about 1 to about 4 parts by weight lignosulfonate per 1 part by weight of borate. Above a ratio of about 4 parts by weight lignosulfonate to 1 part by weight borate, the retarding effect on the cement composition is reduced, and below a weight ratio of about 1:1, gellation of the cement composition generally occurs. A preferred additive of the present invention is comprised of calcium lignosulfonate and potassium pentaborate with the ratio of lignosulfonate to borate being from about 1 to 2 parts by weight lignosulfonate per 1 part by weight of borate.

When a gluconic compound is utilized in the additive, it is preferably present therein in an amount of from about 0.2 to about 1 part by weight per 1 part by weight of lignosulfonic acid salt. A preferred such additive is comprised of calcium lignosulfonate, potassium pentaborate and gluconic acid delta lactone wherein the weight ratio of calcium lignosulfonate to potassium pentaborate is about 1.5:1, and the gluconic acid delta lactone is present in an amount of about 0.33⅓ parts by weight per 1 part by weight of calcium lignosulfonate. Stated another way, the preferred additive comprises calcium lignosulfonate, potassium pentaborate and gluconic acid delta lactone in a weight ratio of 3:2:1 respectively.

The retarder additives of the present invention are utilized in cement compositions comprised of hydraulic cement and water. The cement compositions of the present invention are preferably prepared from American Petroleum Institute cement, classes D, E, G and H with class H being the most preferred.

The amount of water employed in the cement composition is that amount required to effect hydraulic setting of the cement as well as to provide a pumpable slurry thereof. The quantity of water useful herein is in the range of about 0.35 to 0.7 pound of water per 1 pound of dry cement which is approximately equal to 4 to 8 gallons of water to one 94-pound sack of cement.

The retarder additives of the present invention are employed in the cement compositions in an amount of from about 0.1% based on the weight of dry cement to about 10% based on the weight of dry cement. At concentrations below about 0.1% by weight little retardation is effected, and above about 10% by weight the retardation is generally too long. However, the particular quantity of retarder additive utilized depends on a variety of factors such as the particular temperature and pressure to be encountered, the type of cement used, etc. As a general rule, the higher the temperature and pressure, the greater the amount of retarder additive required.

The cement compositions of the present invention can contain a variety of other materials commonly employed in cement slurries for use in wells. For example, the composition can contain sand and various additives for preventing strength retrogration at high temperatures, e.g., silicic acid or silica flour. Additionally, the cement composition may contain salts such as sodium chloride, dispersing additives, and materials for adding weight to the composition, preventing water loss therefrom, and the like. Since these materials and their use in cement compositions are well understood by those skilled in the art, they will not be discussed further herein.

The cement compositions of the present invention are particularly useful in carrying out cementing operations in wells having temperatures in the range of about 300° F. bottom hole circulating temperature up to as high as about 650° F. bottom hole circulating temperature. The static bottom hole temperature of a well can be higher than the bottom hole circulating temperature due to the removal of heat by the fluid being circulated. For example, the static bottom hole temperature can be lowered by circulating drilling mud, and the cementing operation carried out at the lower bottom hole circulation temperature environment. In cementing wells in accordance with the present invention, a set-time retarded cement composition comprised of hydraulic cement, sufficient water to effect hydraulic setting of the cement as well as to provide a pumpable slurry thereof and at least about 0.1% based on the weight of cement of the retarder additive of the present invention is formed. The resulting cement composition is pumped through the casing and into the annular area between the outside surface of the casing and the walls of the well bore, and the composition is held in the well at the desired location therein until setting of the cement composition has occurred.

The cement compositions of the present invention are particularly useful in deep wells in which it is necessary to circulate the composition to the bottom of the well where it encounters high temperatures and then upwardly in the annulus to formations at intermediate depths where it encounters lower temperatures. The cement compositions are resistant to high temperature degradation and retain water so that they remain pumpable for longer periods of time, but after setting result in impermeable hard masses having desired compressive strengths.

In order to further illustrate the invention and present a clear understanding thereof the following examples are given. In the examples, the thickening time test data given are obtained in accordance with the procedure of the American Petroleum Institute described in the publication entitled "API Recommended Practice for Testing Oil-Well Cements and Cement Additives" (Section 7, API RP 10-B, 17th edition, April 1971). This procedure is designed to determine the length of time a given cement slurry remains in a fluid state under given laboratory conditions, and thus serves as a method of comparing various cement compositions. The test apparatus includes a rotating cylindrical slurry container equipped with a stationary paddle assembly, all enclosed in a pressure chamber capable of withstanding the pressures and temperatures described herein. The space between the slurry container and the walls of the pressure container are completely filled with white mineral oil, and a heating element capable of raising the temperature of the oil bath at the rate of at least 5° F. (3° C.) per minutes is provided. Thermocouples are provided for determining the temperature of the oil bath and also that of the cement slurry. The slurry container is rotated at a speed of 150 r.p.m. The consistency of the cement slurry is indicated by the amount of deformation of a standardized coil spring connecting the stirring paddle and a stationary head. The stirring paddle and all metal parts of the slurry container exposed to the slurry are made of corrosion-resistant alloys. A potentiometer mechanism and voltage measuring circuit are provided which are used to indicate the consistency of the slurry tested in units of consistency which are defined by the following equation:

$$T = 78.2 + 20.02U$$

where:

$T$ = torque, g.-cm.

$U$ = units of slurry consistency

The procedure involves quickly pouring the slurry to be tested into the inverted slurry container. During this filling operation, the slurry is lightly stirred to prevent segregation. When the slurry container is completely filled, the bottom is screwed in, care being taken to insure that all air is excluded. The center plug is screwed in tightly, the container placed in the pressure chamber, and the chamber filled with the bath oil. Next, the head assembly of the pressure chamber is screwed in place, the slurry container set to rotating, and the oil-pressure pump started. With the pump in operation, air in the top of the chamber is vented through a top vent. The operation of filling and sealing the slurry container, placing the container in the pressure chamber, sealing and venting the pressure chamber, and placing the apparatus in operation is completed within 5 minutes after completion of the slurry mixing period.

EXAMPLE 1

Cement compositions containing various retarder additives of the present invention are prepared by admixing API Class H cement, sand having the sieve analysis given in Table I below in an amount of 35% by weight of dry cement, water in the ratio of 4.5 gallons of water per 94-pound sack of dry cement and the retarder additive in the amount set out in Table I below.

TABLE I.—SIEVE ANALYSIS [1] OF SAND IN CEMENT COMPOSITIONS

| United States Standard Sieve | Weight percent passing | Weight percent retained |
| --- | --- | --- |
| 40 | 99.97 | 0.03 |
| 60 | 96.71 | 3.26 |
| 100 | 47.09 | 49.62 |
| 140 | 11.10 | 35.99 |
| 200 | 0.84 | 10.26 |
| 325 | 0.04 | 0.80 |
| Pan | 0 | 0.04 |

[1] United States Sieve Series.

For comparison purposes, the various cement compositions are subjected to liner cementing simulation thickening time tests wherein the bottom hole circulating temperature is 400° F., the bottom hole pressure is 20,000 p.s.i., and the time to reach bottom is 58 minutes in accordance with the schedule given in Table II below.

TABLE II.—LINER CEMENTING WELL-SIMULATION TEST SCHEDULE, 400° F. AND 20,000 P.S.I. IN 58 MIN.

| Time (min.) | Pressure (p.s.i.) | Temperature (° F.) | Time (min.) | Pressure (p.s.i.) | Temperature (° F.) |
| --- | --- | --- | --- | --- | --- |
| 0 | 2,000 | 80 | 30 | 11,311 | 247 |
| 2 | 2,620 | 91 | 32 | 11,931 | 258 |
| 4 | 3,241 | 102 | 34 | 12,552 | 269 |
| 6 | 3,862 | 113 | 36 | 13,173 | 280 |
| 8 | 4,483 | 124 | 38 | 13,793 | 291 |
| 10 | 5,103 | 136 | 40 | 14,414 | 302 |
| 12 | 5,724 | 147 | 42 | 15,035 | 313 |
| 14 | 6,345 | 158 | 44 | 15,655 | 324 |
| 16 | 6,966 | 169 | 46 | 16,276 | 335 |
| 18 | 7,583 | 180 | 48 | 16,897 | 346 |
| 20 | 8,207 | 191 | 50 | 17,517 | 358 |
| 22 | 8,828 | 202 | 52 | 18,138 | 369 |
| 24 | 9,448 | 213 | 54 | 18,758 | 380 |
| 26 | 10,069 | 224 | 56 | 19,379 | 391 |
| 28 | 10,689 | 235 | 58 | 20,000 | 400 |

The thickening time data for the various cement compositions described above are set forth in Table III below:

TABLE III.—THICKENING TIME DATA FOR LINER CEMENTING WELL-SIMULATION TEST USING CEMENT SLURRIES CONTAINING VARIOUS RETARDER ADDITIVES OF THE PRESENT INVENTION

| Slurry No. | Retarder additive components | Ratio of additive components, parts by weight | Additive concentration, percent based on weight of dry cement | Pumping time to 100 units of consistency, minutes |
|---|---|---|---|---|
| 1 | Calcium lignosulfonate-potassium pentaborate | 1:1 | 4.0 | 301 |
| 2 | do | 2:1 | 4.0 | 253 |
| 3 | do | 3:1 | 4.0 | 141 |
| 4 | do | 4:1 | 4.0 | 88 |
| 5 | Calcium lignosulfonate-ammonium pentaborate | 1:1 | 4.0 | 318 |
| 6 | do | 2:1 | 4.0 | 275 |
| 7 | do | 3:1 | 4.0 | 239 |
| 8 | do | 4:1 | 4.0 | 191 |
| 9 | Sodium lignosulfonate-potassium pentaborate | 1:1 | 4.0 | 500 |
| 10 | do | 2:1 | 4.0 | 250 |
| 11 | do | 3:1 | 4.0 | 211 |
| 12 | do | 4:1 | 4.0 | 110 |
| 13 | Sodium lignosulfonate-ammonium pentaborate | 1:1 | 4.0 | 216 |
| 14 | do | 2:1 | 4.0 | 337 |
| 15 | do | 3:1 | 4.0 | 197 |
| 16 | do | 4:1 | 4.0 | 182 |
| 17 | Calcium lignosulfonate-potassium pentaborate-gluconic acid delta lactone | 0.75:1.0:0.25 | 2.0; 4.0; 6.0 | 235; 270; 177 |
| 18 | do | 1.5:1.0:0.5 | 2.0; 4.0; 6.0 | 236; 453; 600 |
| 19 | do | 2.25:1.0:0.75 | 2.0; 4.0; 6.0 | 216; 335; 229 |
| 20 | do | 3.0:1.0:1.0 | 2.0; 4.0; 6.0 | 220; 250; 325 |
| 21 | Calcium lignosulfonate-ammonium pentaborate-gluconic acid delta lactone | 0.75:1.0:0.25 | 4.0 | 194 |
| 22 | do | 1.5:1.0:0.5 | 4.0 | 164 |
| 23 | do | 2.25:1.0:0.75 | 4.0 | 171 |
| 24 | do | 3.0:1.0:1.0 | 4.0 | 221 |

The data given in Table III is clearly illustrative of the operability of various embodiments of the present invention.

EXAMPLE 2

In this example, cement slurries containing retarder additives not within the scope of this invention are compared with cement slurries containing retarder additives which are within the scope of the present invention. All the slurries are prepared and tested in the manner described in Example 1 above. The results of these tests and the quantities and types of retarder additives used are shown in Table IV below. It is noted that only slurries 1, 2, and 3 are within the scope of this invention.

TABLE IV.—THICKENING TIME DATA FOR LINER CEMENTING WELL-SIMULATION TESTS USING CEMENT SLURRIES CONTAINING VARIOUS RETARDER ADDITIVES

| Slurry No. | Retarder additive components | Ratio of additive components, parts by weight | Additive concentration, percent based on weight of dry cement | Pumping time to 100 units of consistency, minutes |
|---|---|---|---|---|
| 1 | Calcium lignosulfonate-potassium pentaborate | 1:1 | 4.0 | 301 |
| 2 | Sodium lignosulfonate-potassium pentaborate | 1:1 | 4.0 | 500 |
| 3 | Calcium lignosulfonate-potassium pentaborate-gluconic acid delta lactone | 0.75:1.0:0.25 | 4.0 | 270 |
| 4 | Calcium lignosulfonate | | 4.0 | [1]14 |
| 5 | Potassium pentaborate | | 4.0 | 50 |
| 6 | Calcium lignosulfonate-gluconic acid delta lactone | 3:1 | 4.0 | 105 |
| 7 | Calcium lignosulfonate-borax ($Na_2B_4O_7 \cdot 10H_2O$) | 1:1 | 4.0 | 72 |
| 8 | do | 2:1 | 4.0 | 78 |
| 9 | do | 3:1 | 4.0 | 79 |
| 10 | Sodium pentaborate | | 4.0 | 29 |
| 11 | Gluconic acid delta lactone | | 4.0 | 7 |
| 12 | Gluconic acid delta lactone-potassium pentaborate | 1:1 | 4.0 | [1]120 |
| 13 | do | 2:1 | 4.0 | [1]94 |
| 14 | Gluconic acid delta lactone-borax ($Na_2B_4O_7 \cdot 10H_2O$) | 2:1 | 4.0 | [1]78 |
| 15 | Sodium lignosulfonate-borax ($Na^2B_4O^7 \cdot 10H^2O$) | 1:1 | 4.0 | 103 |
| 16 | do | 2:1 | 4.0 | 93 |
| 17 | Ferrochrome lignosulfonate | | 4.0 | 50 |

[1] Slurry gelled.

From the data presented in Table IV, it is seen that the retarder additives of the present invention achieve longer thickening times as compared to the other retarder additives tested.

EXAMPLE 3

Data on the relative compressive strengths of cement slurries 2, 6 and 18, respectively, described in Example 1 above are tabulated in Table V below.

TABLE V.—COMPRESSIVE STRENGTH DATA

| Retarder additive components | Weight ratio of additive components | Additive concentration, percent based on weight of dry cement | Compressive strength p.s.i. at 400° F. and 3,000 p.s.i. curing conditions | |
|---|---|---|---|---|
| | | | After 24 hours | After 48 hours |
| Calcium lignosulfonate-potassium pentaborate | 2:1 | 4.0 | 2,825 | 5,340 |
| Calcium lignosulfonate-ammonium pentaborate | 2:1 | 4.0 | 3,040 | 3,050 |
| Calcium lignosulfonate-potassium pentaborate-gluconic acid delta lactone | 1.5:1.0:0.5 | 4.0 | 2,960 | 3,040 |

From the foregoing it can be seen that the cement compositions of the present invention have excellent compressive strength after setting.

EXAMPLE 4

Cement compositions containing various quantities of a retarder additive of the present invention are prepared by admixing API Class H cement; sand having the sieve analysis given in Table I above in an amount of 35% by weight of dry cement; water in an amount of 53% by weight of dry cement; a density increasing additive (a reddish hematite ore having a specific gravity of approximately 5.02, commercially available under the Halliburton Services trade designation "HI-DENSE NO. 3") in an amount of 54% by weight of dry cement; a friction reducer (polyvinylpyrrolidone in combination with the condensation product of formaldehyde and the sodium salt of naphthalene sulfonate, available under the Halliburton Services trade designation "CFR-2") in an amount of 2% by weight of dry cement; carboxymethylhydroxyethylcellulose in an amount of 1% by weight of dry cement; and the retarder additive in the amounts set out in Table VII below. The retarder additive is comprised of calcium lignosulfonate, potassium pentaborate and gluconic acid delta lactone in a weight ratio of 3 to 2 to 1, respectively.

For comparison purposes, the various cement compositions are subjected to liner cementing simulation thickening time tests wherein the bottom hole circulating temperature is 500° F., the bottom hole pressure is 18,020 p.s.i., and the time to reach bottom is 60 minutes in accordance with the schedule given in Table VI below.

TABLE VI.—LINER CEMENTING WELL-SIMULATION TEST SCHEDULE, 500° F. AND 18,020 P.S.I. IN 60 MIN.

| Time (min.) | Pressure (p.s.i.) | Temperature (° F.) | Time (min.) | Pressure (p.s.i.) | Temperature (° F.) |
|---|---|---|---|---|---|
| 0 | 2,000 | 80 | 32 | 10,544 | 304 |
| 2 | 2,534 | 94 | 34 | 11,078 | 318 |
| 4 | 3,068 | 108 | 36 | 11,612 | 332 |
| 6 | 3,602 | 122 | 38 | 12,146 | 346 |
| 8 | 4,136 | 136 | 40 | 12,680 | 360 |
| 10 | 4,670 | 150 | 42 | 13,214 | 374 |
| 12 | 5,204 | 164 | 44 | 13,748 | 388 |
| 14 | 5,738 | 178 | 46 | 14,282 | 402 |
| 16 | 6,272 | 192 | 48 | 14,816 | 416 |
| 18 | 6,806 | 206 | 50 | 15,350 | 430 |
| 20 | 7,340 | 220 | 52 | 15,884 | 444 |
| 22 | 7,874 | 234 | 54 | 16,418 | 458 |
| 24 | 8,408 | 248 | 56 | 16,952 | 472 |
| 26 | 8,942 | 262 | 58 | 17,486 | 486 |
| 28 | 9,476 | 276 | 60 | 18,020 | 500 |
| 30 | 10,010 | 290 | | | |

The thickening time data for the various cement compositions described above are set forth in Table VII below.

TABLE VII.—THICKENING TIME DATA FOR LINER CEMENTING WELL-SIMULATION TESTS USING CEMENT COMPOSITIONS OF THE PRESENT INVENTION

| Test No. | Retarder additive, percent by weight of dry cement | Pumping time to 100 units of consistency, minutes |
|---|---|---|
| 1 | 6.0 | 450 |
| 2 | 5.0 | 363 |
| 3 | 4.5 | 280 |
| 4 | 4.0 | 130 |

The compressive strengths of the cement compositions described above (Tests Nos. 1–3 of Table VII) after curing for the times and at the temperatures given in Table VIII are tabulated in Table VIII below.

TABLE VIII.—COMPRESSIVE STRENGTH DATA

| Cure time, hours | Cure temperature, ° F. | Test No. 1, p.s.i. | Test No. 2, p.s.i. | Test No. 3, p.s.i. |
|---|---|---|---|---|
| 24 | 400 | | 610 | 581 |
| 24 | 470 | | 910 | 1,058 |
| 48 | 400 | | 1,738 | 1,580 |
| 48 | 470 | | 993 | 1,063 |
| 72 | 400 | 1,670 | 1,668 | 1,778 |
| 72 | 470 | 1,062 | 1,025 | 1,195 |

It will be understood by those skilled in the art that considerable variation in the relative amounts of the different components of the cement compositions of the present invention is permissible and the invention is not to be limited to the specific examples which are given herein for the purpose of disclosure.

What is claimed is:

1. An additive for retarding the setting of cement compositions which comprises:
a mixture of a lignosulfonic acid salt selected from the group consisting of an alkaline earth metal lignosulfonate, an alkali lignosulfonate, and ammonium lignosulfonate, and a borate compound selected from the group consisting of alkaline earth metal pentaborates, alkali metal pentaborates and ammonium pentaborates, wherein the weight ratio of said lignosulfonic acid salt to said borate compound in said mixture is in the range of about 1 to about 4 parts by weight lignosulfonic acid salt per 1 part by weight of borate compound.

2. The additive of claim 1 wherein the lignosulfonic acid salt is selected from calcium lignosulfonate, magnesium lignosulfonate, barium lignosulfonate, sodium lignosulfonate, potassium lignosulfonate and lithium lignosulfonate.

3. The additive of claim 2 wherein the borate compound is selected from calcium pentaborate, magnesium pentaborate, barium pentaborate, sodium pentaborate, potassium pentaborate and lithium pentaborate.

4. The additive of claim 1 wherein the lignosulfonic acid salt is calcium lignosulfonate.

5. The additive of claim 4 wherein the borate compound is potassium pentaborate.

6. The additive of claim 5 wherein the weight ratio of calcium lignosulfonate to potassium pentaborate is about 1 to 2 parts calcium lignosulfonate per 1 part of potassium pentaborate.

7. The additive of claim 1 which is further characterized to include in said mixture a gluconic compound selected from gluconic acid gluconic acid delta lactone, an alkali metal gluconate, and an alkaline earth metal gluconate, said gluconic compound being present in said mixture in an amount of from about 0.2 to about 1 part by weight per 1 part by weight of lignosulfonic acid salt.

8. The additive of claim 7 wherein the gluconic compound is selected from gluconic acid, gluconic acid delta lactone, sodium gluconate, potassium gluconate, lithium gluconate, calcium gluconate, magnesium gluconate, and barium gluconate.

9. The additive of claim 7 wherein the lignosulfonic acid salt is calcium lignosulfonate, the borate compound is potassium pentaborate, and the gluconic compound is gluconic acid delta lactone.

10. The additive of claim 9 wherein the ratio of calcium lignosulfonate to potassium pentaborate is about 1.5:1 and the gluconic acid delta lactone is present in an amount of about 0.33⅓ parts by weight per part of calcium lignosulfonate.

11. A cement composition particularly suitable for pumping through and setting in a temperature environment in excess of about 300° F. comprising hydraulic cement, sufficient water to effect hydraulic setting of said cement and provide a pumpable slurry thereof, and at least about 0.1% based on the weight of cement of an additive comprising a mixture of a lignosulfonic acid salt selected from the group consisting of an alkaline earth metal lignosulfonate, an alkali metal lignosulfonate and ammonium lignosulfonate, and a borate compound selected from the group consisting of alkaline earth metal pentaborates, alkali metal pentaborates and ammonium pentaborate, the ratio by weight of said lignosulfonic acid salt to said borate compound in said additive varying from about 1 to about 4 parts by weight lignosulfonic acid salt per 1 part by weight of borate compound.

12. The cement composition of claim 11 wherein the lignosulfonic acid salt is selected from calcium lignosulfonate, magnesium lignosulfonate, barium lignosulfonate, sodium lignosulfonate, potassium lignosulfonate and lithium lignosulfonate.

13. The cement composition of claim 12 wherein the borate compound is selected from calcium pentaborate, magnesium pentaborate, barium pentaborate, sodium pentaborate, potassium pentaborate and lithium pentaborate.

14. The cement composition of claim 11 wherein the lignosulfonic acid salt is calcium lignosulfonate.

15. The cement composition of claim 14 wherein the borate compound is potassium pentaborate.

16. The cement composition of claim 15 wherein the weight ratio of said calcium lignosulfonate to potassium pentaborate is about 1 to 2 parts per 1 part of potassium pentaborate.

17. The cement composition of claim 11 which is further characterized to include in said additive a gluconic compound selected from gluconic acid, gluconic acid delta lactone, an alkali metal gluconate, and an alkaline earth metal gluconate, said gluconic compound being present in said mixture in an amount of from about 0.2 to about 1 part by weight per 1 part by weight of lignosulfonic acid salt.

18. The cement composition of claim 17 wherein the gluconic compound is selected from gluconic acid, gluconic acid delta lactone, sodium gluconate, potassium gluconate, lithium gluconate, calcium gluconate, magnesium gluconate, and barium gluconate.

19. The cement composition of claim 17 wherein the lignosulfonic acid salt is calcium lignosulfonate, the borate compound is potassium pentaborate and the gluconic compound is gluconic acid delta lactone.

20. The cement composition of claim 19 wherein the weight ratio of said calcium lignosulfonate to said potassium pentaborate is 2 parts per 1 part of borate compound and the gluconic acid delta lactone is present in an amount of 0.33⅓ parts by weight per 1 part of calcium lignosulfonate.

References Cited
UNITED STATES PATENTS

| | | | |
|---|---|---|---|
| 3,053,673 | 9/1962 | Walker | 106—90 |
| 3,662,830 | 5/1972 | Martin | 166—293 |

S. L. BERGER, Assistant Examiner

DELBERT E. GANTZ, Primary Examiner

U.S. Cl. X.R.

106—315

UNITED STATES PATENT OFFICE
CERTIFICATE OF CORRECTION

Patent No. 3,748,159         Dated   July 24, 1973

Inventor(s)  Charles R. George

It is certified that error appears in the above-identified patent and that said Letters Patent are hereby corrected as shown below:

In Column 2, line 22:  Insert a comma (,) between the words "gluconate" and "magnesium".

In Column 4, line 37:  Delete "Table I" and insert --Table III-- therefor.

In Column 5, TABLE IV:

For Slurry 15, delete the formula $$"(Na^2B_4O^711OH^2O)"$$

and insert therefor $$--(Na_2B_4O_7 \cdot 10H_2O)--.$$

In Claim 7, line 3, insert a comma (,) between the word "acid" (first occurrence) and the word "gluconic" (second occurrence).

Signed and sealed this 20th day of November 1973.

(SEAL)
Attest:

EDWARD M. FLETCHER, JR.　　　　　RENE D. TEGTMEYER
Attesting Officer　　　　　　　　Acting Commissioner of Patents